United States Patent [19]

Climent et al.

[11] Patent Number: 4,887,180
[45] Date of Patent: Dec. 12, 1989

[54] DEVICE FOR PROTECTING ELECTRONIC EQUIPMENT AGAINST STRONG ELECTROMAGNETIC PULSES, MORE PARTICULARY DUE TO LIGHTENING

[75] Inventors: Jean-Pierre Climent, Saint Germain Les Corbeil; Jean-Claude Tronel, Bretigny Sur Orge, both of France

[73] Assignee: Commissariat a l'Energie Atomique, Paris, France

[21] Appl. No.: 206,723

[22] Filed: Jun. 15, 1988

[30] Foreign Application Priority Data

Jun. 16, 1987 [FR] France ............................... 87 08361
Jun. 16, 1987 [FR] France ............................... 87 08362

[51] Int. Cl.⁴ .............................................. H02H 3/20
[52] U.S. Cl. ........................................ 361/91; 361/56; 361/117; 307/91; 307/100
[58] Field of Search .................... 361/56, 91, 111, 117, 361/118; 307/91, 100

[56] References Cited

U.S. PATENT DOCUMENTS 4,328,523  5/1982  Sequin .................................... 361/56
4,675,772  6/1987  Epstein .................................. 361/56

*Primary Examiner*—Derek S. Jennings
*Attorney, Agent, or Firm*—Nixon & Vanderhye

[57] ABSTRACT

A device for protecting electronic equipment (42) against strong electromagnetic pulses, the equipment being contained in a radioelectrically insulated enclosure (40) and connected to a line outside the enclosure, the protective device being disposed in another radioelectrically insulated enclosure (2) and comprising an input (4) connected to said line (6) and an output (8) connected to the equipment, the device being characterized in that it comprises in series: at least one first clipping cell (12A) comprising a clipper having one end connected to the input of the clipping cell and another end to ground, and a low-pass filter disposed between the input and the output of the clipping cell, and a filtering cell (14) comprising in series a low-pass filter (12A) and if necessary a device (14B) for switching the cut-off frequency of the filter. The device is particularly applicable to the protection of telephonic and digital lines.

22 Claims, 4 Drawing Sheets

DEVICE FOR PROTECTING ELECTRONIC EQUIPMENT AGAINST STRONG ELECTROMAGNETIC PULSES, MORE PARTICULARY DUE TO LIGHTENING

BACKGROUND OF THE INVENTION

1. Field of the Invention

The invention relates to a device for protecting electronic equipment against strong electromagnetic pulses. It is an object of the device according to the invention to give protection against intense electromagnetic pulses, such as those produced by lightning. A fortiori, the device according to the invention can be used for protection against a less intense electromagnetic perturbation.

2. Discussion of Prior Art

In general it may be considered that disturbances to electronic eqiupment are due to two causes, on the one hand the direct coupling of an electromagnetic field with the electronic equipment, and on the other hand injection via connections (communication, electric supply, ...) associated with such equipment. The injection itself is due to the coupling between the electromagnetic field and the connection.

Direct coupling between the electromagnetic field and the electronic equipment can be eliminated in known manner by disposing the electronic equipment to be protected in a radioelectrically protected enclosure (Faraday cage). However, such protection is inadequate if the electronic equipment disposed in the Faraday cage is connected to other equipment outside the cage via an unprotected connection.

The injection of an electromagnetic pulse into the connection results in a stray voltage and/or current pulse of very high maximum value. In the case of lightning, the voltage may reach 10 kV and the intensity 20 kA. Such a pulse propagated over a connection reaches the equipment at an input where it normally receives a signal of much lower voltage, of the order of 500 volts for an electric supply connection and a few tens of volts for a telephone or digital connection. Such a pulse is therefore highly liable to damage the electronic equipment very seriously.

The prior art, more particularly French Patent 2563058, filed in the Applicants' name on Apr. 17, 1984, discloses a device for protecting electronic equipment against strong electromagnetic pulses. The device is disposed between a connection and the equipment to be protected. The device comprises a non-linear element of clipper type to divert the maximum intensity of the electromagnetic pulse from the connection to ground, and a filtering means also for drawing off current and/or energy not diverted after clipping, but also for attenuating the voltage level of the pulse after clipping.

The device gives protection against intense electromagnetic pulses whose rising front is very fast, such as an impulse caused by lightning.

SUMMARY OF THE INVENTION

While the device disclosed in French Patent 2563058 is adapted to be disposed between a low voltage supply line and the electronic equipment to be protected, so that it has practically no restrictions as regards its passband, the device to which the present invention relates is adapated to be disposed both between a supply line and the electronic eqiupment, and also between a signal transmission line and the electronic equipment. The device according to the invention is therefore designed not to cause any weakening of a wanted signal, more particularly as regards its amplitude and frequency spectrum.

More precisely, the invention relates to a device for protecting electronic equipment against strong electromagnetic pulses, the equipment being contained in a radioelectrically insulated enclosure and connected to a line outside the enclosure, the protective device being disposed in another radioelectrically insulated enclosure and comprising an input connected to said line and an output connected to the equipment, the device being characterized in that it comprises in series at least one clipping cell and a filtering cell, the clipping cell comprising a clipper and a low-pass filter, and the filtering cell comprising a low-pass filter.

In a preferred embodiment, the device comprises a second clipping cell comprising a clipper having one end connected to the input of the clipping cell and another end to ground, the clipper of the second cell and the clipper of the first cell having different dynamic triggering characteristics and the low-pass filter of the first clipping cell creating an overvoltage at the terminals of the second clipper for a resonance frequency higher than the maximum frequency contained in the signals normally transmitted on the line.

Advantageously the low-pass filter of the first clipping cell is an L filter.

Advantageously the clippers are dischargers.

Advantageously the second discharger is of the triple-pole or gate kind, the second clipping cell also comprising a low-pass filter made up in series of an inductance, a capacitor and an inductance and connected between the input of the main clipping cell and ground, the gate of the second discharger being connected to the common point between the capacitor and the second-mentioned inductance.

If the lines carry signals having a frequency higher than 1 MHz, such as lines carrying digital signals, the filtering cell (14) also comprises a means for switching the cut-off frequency of the low-pass filter in series therewith.

Advantageously the switching means comprises in series a capacitor and an inductance disposed between the line and ground, and elements with a conduction threshold at the terminals of the inductance, the threshold being so determined that said elements are conductive when the signal on the line has an amplitude higher than the maximum amplitude of the signals normally transmitted on the line.

The threshold elements used are diodes.

In a preferred embodiment the first clipper, the assembly formed by the filter of the main clipping cell and the second clipper, and the filtering cell are each contained in a radioelectrically insulated enclosure.

BRIEF DESCRIPTION OF THE DRAWINGS

The features and advantages of the invention will be gathered more clearly from the following illustrative, non-limited description with reference to the accompanying drawings, wherein.

DETAILED DESCRIPTION OF PREFERRED EMBODIMENT

Throughout the description like elements have like references.

Figure 1:
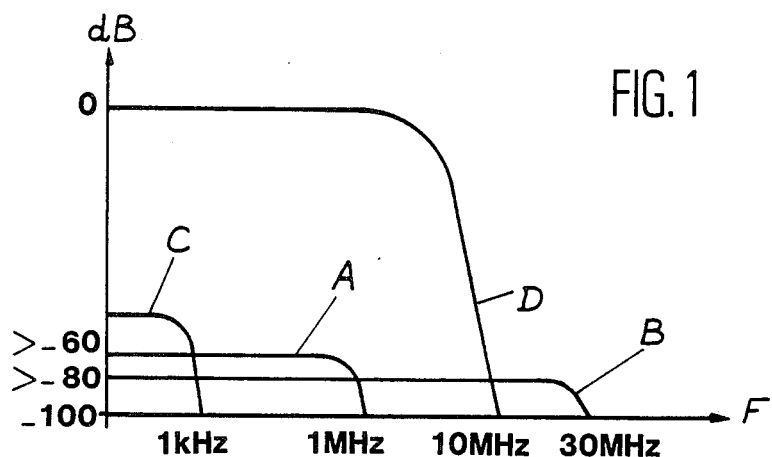
FIG. 1 is a graph illustrating the frequency spectrum for different kinds of signals.

FIG. 1 shows the frequency spectra of the signals normally transmitted via a connection, and the frequency spectrum corresponding to an intense electromagnetic pulse due to lightning. In the graph the abscissa denotes the frequency F and the ordinate the amplitude in dB.

Curve A is the frequency spectrum of a low output signal transmitted on a telephone or computer line, curve B being the frequency spectrum of a digital signal transmitted on a low output computer line. The signals are characterized by low amplitude and considerable width of frequency (between about 1 MHz and 30 MHz) in relation to an electric supply signal transmitted on a supply or remote control line. Such a signal, whose frequency spectrum is represented by curve C has a pass-band limited to 1 kHz at the most.

The transmission lines of telephone or computer signals are also used for transmitting service signals, such as the ringing bell or call code of a subscriber in the case of a telephone line. Such service signals generally have a higher amplitude and a lower frequency than the signals normally transmitted on the transmission line. This must be taken into account.

FIG. 1 also shows the frequency spectrum of an intense electromagnetic pulse caused by lightning. The spectrum corresponds to curve D.

The device according to the invention enables electronic equipment to be protected against such an electromagnetic pulse without perturbing the signals normally present on the transmission line.

Figure 2:
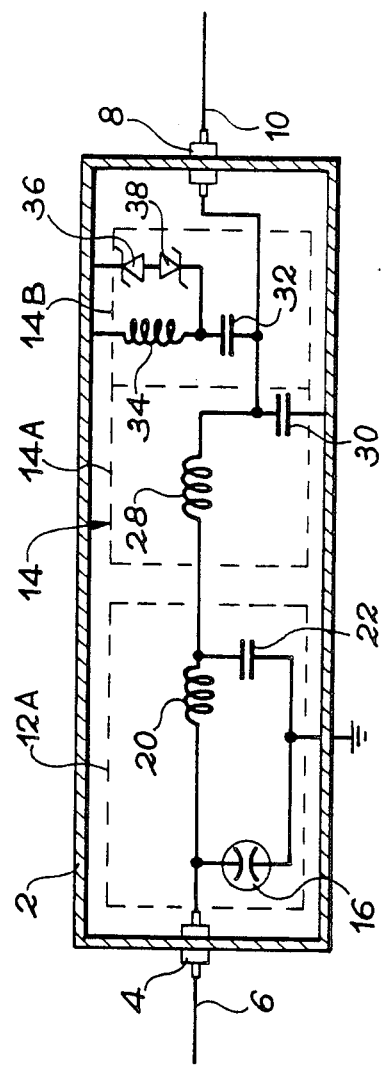
FIG. 2 shows diagrammatically an embodiment of the device according to the invention.

FIG. 2 shows diagrammatically an embodiment of the device according to the invention. The device is disposed in a radioelectrically insulated enclosure 2, such as a Faraday cage.

This comprises a first opening 4 receiving a connection 6 not protected against electromagnetic perturbations, and a second opening 8 from which a connection 10 extends which is protected against electromagnetic perturbations, this connection being connected via its other end to electronic equipment to be protected. The openings 4 and 8 are produced in accordance with the rules konwn to engineers in the art, so as to maintain electric insulation inside the enclosure 2.

The protected device according to the invention is made up of a clipping cell 12 and a filtering cell 14 disposed in a series in the enclosure 2. The function of the clipping cell 12 is to dissipate to ground the maximum energy of the unprotected line, while the function of the filtering cell 14 is to adapt the pass-band to the signal normally transmitted on the line and to reduce the residual voltage not dissipated by the clipping cell.

The clipping cell 12 comprises a clipper one end of which is connected to the connection to be protected, the other end being connected to the enclosure, which is connected to ground. The clipper is, for example, a discharger 16 having the following characteristics:

a low dynamic triggering voltage $V_1$ as a function of the high dV/dt slope of the perturbing electromagnetic pulse, a high dissipation power for absorbing without destruction the energies due to intense electromagnetic pulses, such as lightning, a low internal impedance in ionized conditions (arc resistance and arc inductance) to limit the residual voltage of the clipper.

The clipper cell 12 also comprises a low-pass filter, preferably a L filter comprising an inductance 20 and a capacitor 22. The inductance 20 is connected by one end to the opening 4. The capacitor 22 is connected on the one hand to the other end of the inductance 20, and on the other hand to ground via the enclosure 2.

The low pass filter offers a high input impedance to the penetration of high frequencies. When an electromagnetic pulse with a fast rising front appears on the line, the filter facilitates fast switching of the clipper of the input stage.

When the clipper is switched, its stray elements set up at its terminals a residual waste voltage. The filter also dissipates current and/or energy not diverted on clipping, but it also attenuates the voltage level of the pulse after clipping, more particularly in the high fequency zone of the spectrum of the pulse.

As has already been indicated, the signals normally transmitted on the line can be accompanied by service signals (bell ringing or call code in the case of a telephone line) which have a low frequency, but a relatively high level.

Figure 3:
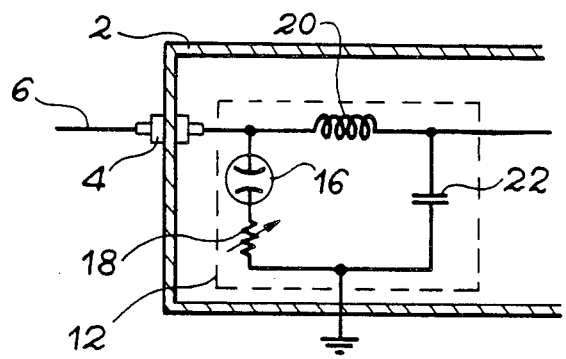
FIG. 3 illustrates a variant embodiment of the clipping cell, wherein the clipper is formed by a discharger and a varistor.

The voltage level of such a signal can be adequate to keep the clipper of the clipping cell conductive after it has been triggered by an intense electromagnetic pulse. To avoid this, and therefore facilitate the switching of the clipper after it has been triggered, advantageously a varistor 18 (FIG. 3) is disposed in series with the discharger 16.

Let us now return to FIG. 2.

The filtering cell 14 comprising a filter 14A whose pass-band is adapted to the frequency spectrum of the signals normally transmitted on the line, and a means 14B for modifying a cut-off for frequency of the filter 14A.

The filter 14A is a low-pass L filter comprising an inductance 28 and a capacitor 30. The inductance 28 is in series with the inductance 20 of the module 12, and the capacitor 13 is disposed between the connection and ground, downstream of the inductance 28.

The means 14B is composed in series of a capacitor 32 and an inductance 34 disposed in parallel with the capacitor 30. This means also comprises non-linear elements with a threshold, such as diodes, for example, Zener diodes 36 and 38, as shown in the drawings, disposed in parallel with the inductance 34.

The filtering cell 14 operates as follows. In normal time, when no intense electromagnetic pulse is present on the line, the upper cut-off frequency defined by the filter 14a is higher than the maximum frequency of the signals normally transmitted. The filtering cell 14 therefore has no effect.

When an intense electromagnetic pulse appears on the line, a considerable proportion of the energy of the pulse is diverted by the clipping cell 12. However, a fraction of the energy of the pulse reaches the filtering cell 14 and the diodes 36 nd 38 become conductive. The capacitor 32 is then placed in parallel with the capacitor 30, thus temporarily reducing the pass-band of the filter 14A. The result is a further attenuation of the stray signal delivered by the clipping cell 12.

The conduction threshold of the diodes 36 and 38 must be so determined that any service signals (bell ringing or call code) does not cause the diodes to be conductive since, if such were to be the case, the service signals would be absorbed by the filtering cell 14 and would no longer be present at the output of the protective device. The conduction threshold of the diodes is therefore fixed at a value slightly higher than the level of the most intense signals normally transmitted on the line, corrected by the division ratio defined by the capacitor 32 and the inductance 34.

If the connection 6 is a line for digital signals having a pass-band of a few megahertz, the protective device can be formed, for example, by a clipping cell, such as that shown in FIG. 2, followed by a filtering cell, such as that of the device shown in FIG. 2. The device can comprise the following elements:

clipper 16: fast clipper
inductance 20: 2.2 uH
capacitor 22: 100 pF
inductance 28: 2.2 uH
capacitor 30: 100 pF
capacitor 32: 1 uF
inductance 34: 22 mH
diodes 36, 38: Zener diodes
threshold voltage: 10 to 20 volts.

In this device, by way of example, the clipping cell produces an attenuation of about 40 dB, leaving a residual voltage of several hundreds of volts for a pulse on the line having several tens of kilovolts. The attenuation produced by the filtering cell is about 20 dB; the residual pulse on the line is then no more than a few tens of volts.

Figure 4:
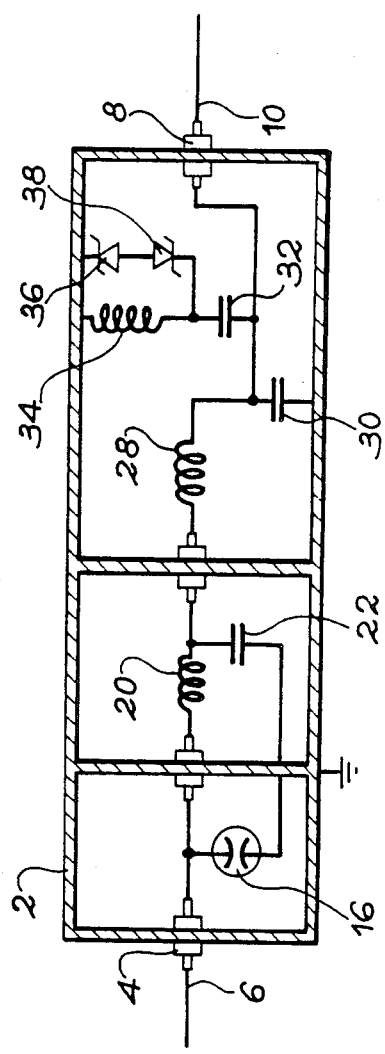
FIG. 4 illustrates a variant embodiment of the device according to the invention, wherein the elements of the device are disposed in different radioelectrically insulated enclosures.

FIG. 4 shows a variant embodiment of the device according to the invention, comprising like elements to those in FIG. 2. It is distinguished therefrom by the feature that the clipper 16, the filter 20–22 and the filtering cell 14 are each disposed in a radioelectrically insulated enclosure. This structure allows better electromagnetic insulation of the various elements of the device.

The protective device according to the invention is adapted to protect electronic equipment itself disposed in a radioelectrically protected enclosure.

Figures 5A, 5B:
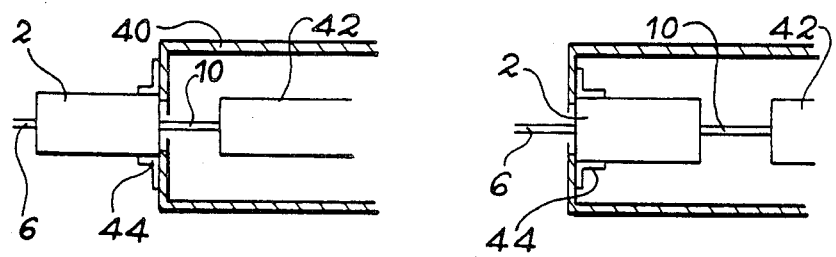
FIGS. 5a and 5b illustrate two modes of implanting the device according to the invention on a radioelectrically insulated enclosure.

FIGS. 5a and 5b show two modes of implanting the device according to the invention on such enclosure.

Referring to FIG. 5a, the protective device 2 according to the invention is disposed on the outer face of the radioelectrically protected enclosure 40 containing the electronic equipment 42 to be protected.

The protective device 2 can be attached to the enclosure 4 by any means known to engineers in the art, more particularly, as shown in FIG. 5a, by means of angle irons 44.

As shown in FIG. 5, the protective device 2 has been fixed by means of angle irons 4 to the inner face of the enclosure 40.

Figure 6:
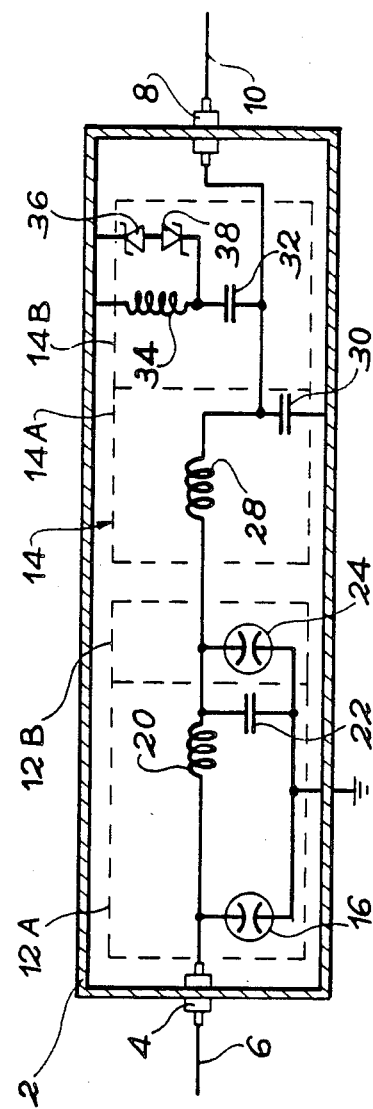
FIG. 6 shows diagrammatically a second embodiment of the device according to the invention.

FIG. 6 shows diagrammatically a second embodiment of the device according to the invention.

In the second embodiment the device comprises a second clipping cell 12B in series between the first clipping cell 12A and the pass-band filter 14.

The device is disposed in a radioelectrically insulated enclosure 2, such as a Faraday cage.

The cage comprises a first opening 4 receiving a connection 6 which is not protected against electromagnetic perturbation, and a second opening 8 from which a connection 10 extends which is protected against electromagnetic perturbations, this connection being connected via its other end to electronic equipment to be protected. The openings 4 and 8 are produced by rules known to engineers in the art, so as to maintain electric insulation inside the enclosure 2.

The function of the clipping cells is to dissipate the maximum energy of the unprotected line to ground, the function of the filtering cell 14 being to adapt the pass-band to the signal normally transmitted on the line and to reduce the residual voltage not dissipated by the clipping cell.

The second clipping cell 12B comprises a second clipper 24 one end of which is connected to the other end of the inductance 20, its other end being connected to ground via the enclosure 2. The low pass filter 2 offers a high input impedance to the penetration of high frequencies. When an electromagnetic pulse with a fast rising front appears on the line, the low-pass filter therefore facilitates fast switching of the clipper of the main cell.

When the clipper of the cell is switched, the stray elements of the clipper create at its terminals a residual waste voltage having a frequency spectrum belonging to the original electromagnetic spectrum. The filter 20, 22 enables a preferential frequency to be taken from the spectrum by series resonance. This produces an overvoltage at the terminals of the capacitor 22 and enables the second clipper 24 to be triggered.

The resonance frequency of the filter is a frequency slightly higher than the upper limit of the frequency spectrum of the signals normally transmitted on the line, and the clipper 24 is so selected as to have a low triggering voltage for such resonance frequency.

This structure of the clipping cells allows the successive triggering of the two clippers 16 and 24, so that they participate together in dissipating the energy of strong electromagnetic pulses.

Figure 7:
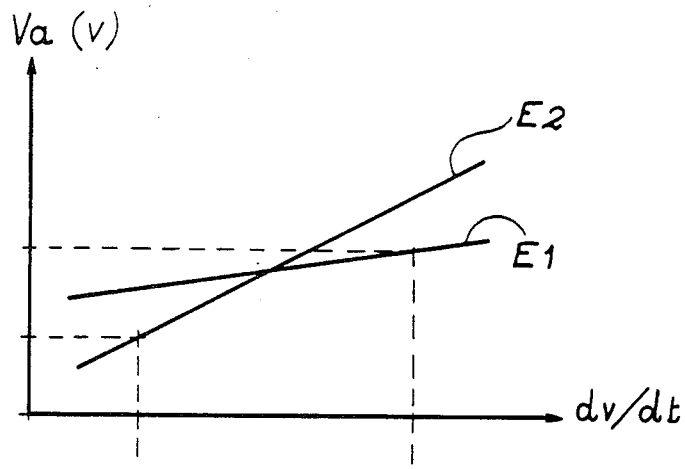
FIG. 7 is a graph showing the dynamic triggering characteristics of the two clippers of the clipping cells of the device according to the invention.

The dynamic triggering characteristics of the two clippers are shown in graph form in FIG. 7. The curves $E_1$ and $E_2$ of the triggering voltages of the clippers 16 and 24 indicate the triggering voltage $V_a$ as a function of the dV/dt slope of the pulse signal received.

The two curves are different. The clipper 16 has a low triggering voltage for pulses of high slope, something which enables a considerable proportion of the energy of an electromagnetic pulse to be diverted. The second clipper 24 therefore receives a pulse of lower intensity and also with a lower slope. If must therefore have a low triggering voltage for a lower pulse slope. Its triggering is assisted by the filter formed by the inductance 20 and the capacitor 22 which precisely creates an overvoltage in the low-frequency portion of the residual pulse signal.

The graph (FIG. 7) shows examples of triggering characteristics $E_1$ and $E_2$ for the clippers 16 and 24. The clippers are selected in relation to the particular intended application, more particularly the characteristics (frequency and intensity) of the wanted signals transmitted on the line.

Figure 8:
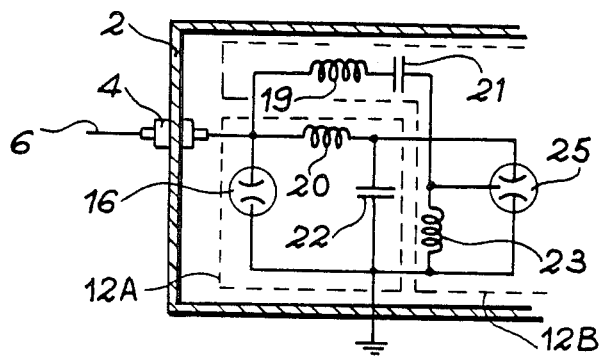
FIG. 8 illustrates a variant embodiment of the clipping cells, wherein the second clipper is a discharger of the triple-pole or gate kind.
Figure 9:
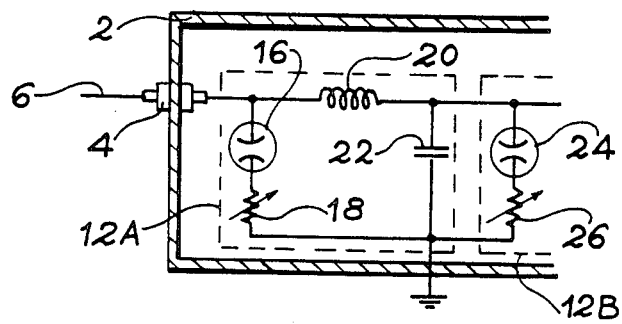
FIG. 9 illustrates another variant embodiment of the clipping cells, wherein each clipper is made up of a discharger and a varistor.

FIG. 8 shows a variant embodiment of the clipping cells of the device according to the invention which differs from the clipping cells of the device illustrated in FIG. 2, in that the second clipper is a discharger 25 of triple-pole or gate kind.

A pulse taken from the input 4 and of reversed polarity to that applied to the hot electrode (i.e., connected to the line 6) of the discharger 25 is applied to the gate. This facilitates and improves the triggering of the second clipper, something which is desirable more particularly when the residual voltage delivered by the first clipper is rather low.

An assembly comprising in series an inductance 19, a capacitor 21 and an inductance 23 is disposed in parallel with the first discharger 16. The voltage applied to the gate is taken from the common point of the capacitor 21 and the inductance 23.

The clipping cells shown in FIGS. 2 and 4 are well adapted to cases in which the line transmits only low intensity signals.

However, as has been already indicated, the signals normally transmitted on the line can be accompanied by service signals (bell ringing or call code in the case of a telephone line) of low frequency but relatively high level.

The voltage level of such a signal may be adequate to keep the clippers of the clipping cell conductive after they have been triggered by an intense electromagnetic pulse. To avoid this and therefore facilitate the switching of the clipper after its triggering, varistors 18 and 26, as shown in FIG. 5, are advantageously disposed in series with the dischargers 16 and 24.

Let us now return to FIG. 6.

The filtering cell 14 comprises the filter 14a whose pass-band is adapted to the frequency spectrum of the signals normally transmitted on the line, and the means 14b for modifying the cut-off frequency of the filter 14.

The filter 14A is a low-pass L filter identical with that disclosed in FIG. 2 with inductance 20 of the module 12A, and the capacitor 30 is disposed between the connection and ground, downstream of the inductance 28.

Just as in the case of FIG. 2, the means 14B is not required for all applications. It is more particularly advantageous for lines transmitting signals of frequency higher than 1 MHz, such as digital lines. The structure of the filter 14A also depends on the line. The inductance 28 can be advantageously replaced by a resistor for lines transmitting signals of frequency lower than 1 kHz.

Means 14B show in FIG. 6 is identical with that shown in FIG. 2.

Figure 10:
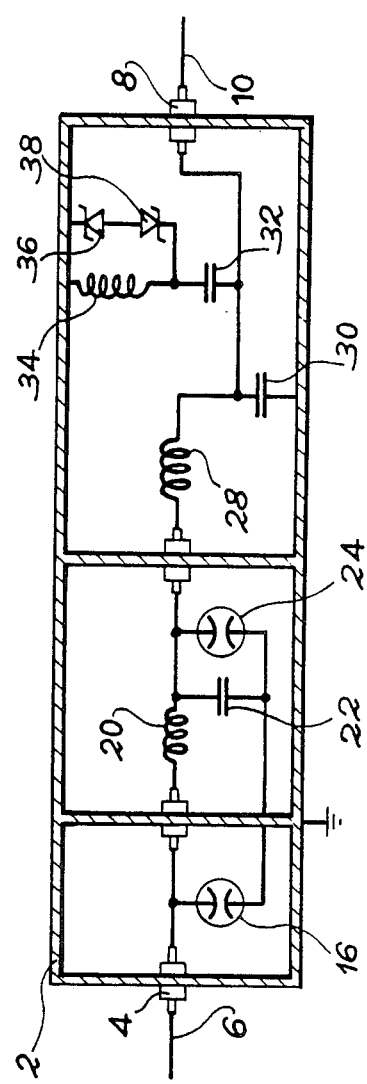
FIG. 10 illustrates a variant embodiment of the device according to the invention, wherein the elements of the device are disposed in different radioelectrically insulated enclosures.

FIG. 10 shows a variant embodiment of the device according to the invention, comprising like elements to those shown in FIG. 6, from which it is distinguished by the feature that the first clipper 16, the assembly formed by the filter 20, 22 and the second clipper 24 and the filtering cell 14 are each disposed in a radioelectrically insulated enclosure. This structure allows better electromagnetic insulation of the various elements of the device.

If the connection 6 is a line for digital signals having a pass-band of several megahertz, the protective device can be formed, for example, by a clipping cell, such as that shown in FIG. 4, followed by a filtering cell, such as that of the device shown in FIG. 2.

If the connection 6 is a telephone connection having a pass band of several kilohertz, the protective device can be formed, for example, by a clipping cell, as shown in FIG. 4, followed by a filtering cell comprising solely the filter 14a of the device shown in FIG. 2. The device can comprise the following elements:

clipper 16 : fast clipper
clipper 25 : fast triple-pole or gate-type clipper
inductance 19: 0.5 uH
inductance 20: 2.2 uH
capacitor 21: 50 pF
capacitor 22: 100 pF
inductance 23: 1.5 uH
inductance 28: 22 uH
capacitor 30: 100 pH The protective device according to the invention is adapted to protect electronic equipment disposed in a radioelectrically protected enclosure.

The protective device 2 or 6 can be attached to the enclosure 40 by any means known to engineers in the art and more particularly, as shown in the drawings, by means of angle irons 44.

In the case of electronic equipment to which a number of transmission and/or supply lines are connected, a protective device according to the invention is disposed on each line. Thus, for example, for bifilar telephone connections two protective devices are used, while four protective devices are used for quadrifilar MIC-type digital connections. In these cases the devices can be assembled in the same casing, as shown in FIGS. 4 and 10.

Translation of wording on drawings:

FIGS. 2 6: (on left) - unprotected connection; (on right, above) - protected connection, (below) - to electric equipment.

FIG. 7: (on left) - resonance frequency of the filter, (on right) - slope of the pulse.

We claim:

1. A device for protecting electronic equipment (42) against strong electromagnetic pulses, the equipment being contained in a radioelectrically insulated enclosure (40) and connected to a line outside the enclosure, the protective device being disposed in another radioelectrically insulated enclosure (2) and comprising an input (4) connected to said line (6) and an output (8) connected to the equipment, the device being characterized in that it comprises in series:

at least on first clipping cell (12A) comprising a clipper having one end connected to the input of the clipping cell and another end to ground, and a low-pass filter disposed between the input and the output of the clipping cell, and a filtering cell (14) comprising a low-pass filter (14a).

2. A device according to claim 1, characterized in that it comprises a second clipping cell (12B) comprising a clipper having one end connected to the input of the clipping cell and another end to ground, the clipper of the second cell and the clipper of the first cell having different dynamic triggering characteristics and the low-pass filter of the first clipping cell creating an overvoltage at the terminals of the second clipper for a resonance frequency higher than the maximum frequency contained in the signals normally transmitted on the line.

3. A device according to claims 1 or 2, characterized in that the low-pass filter of the first clipping cell (12A) is an L filter (20, 22).

4. A device according to any of claims 1 to 2, characterized in that each clipper is a discharger (16, 24).

5. A device according to claim 2, characterized in that the second discharger (25) is of the triple-pole or gate kind, the second clipping cell (12B) also cmprising a low-pass filter made up in series of an inductance (19), a capacitor (21) and an inductance (23) and connected between the input of the main clipping cell and ground, the gate of the second discharger being connected to the common point between the capacitor (21) and the second-mentioned inductance (23).

6. A device according to claim 2, characterized in that a varistor (18, 26) is also disposed between each discharger and ground.

7. A device according to claim 1, characterized in that the filtering cell (14) also comprises a means (14B) for switching the cut-off frequency of the low-pass filter (14A) in series therewith.

8. A device according to claim 7, characterized in that the switching means (14B) comprises in series a capacitor (32) and an inductance disposed between the line and ground, and elements with a conduction threshold at the terminals of the inductance, the threshold being so determined that said elements are conductive when the signal on the line has an amplitude higher than the maximum amplitude of the signals normally transmitted on the line.

9. A device according to claim 8, characterized in that the threshold elements are diodes (36, 38).

10. A device according to claim 1, characterized in that the first clipper, the assembly formed by the filter of the main clipping cell and the second clipper, and the filtering cell are each contained in a radioelectrically insulated enclosure.

11. A device according to claim 3 characterized in that each clipper is a discharger (16, 24).

12. A device according to claim 3, characterized in that a varistor (18, 26) is also disposed between each discharger and ground.

13. A device according to claim 4, characterized in that a varistor (18, 26) is also disposed between each discharger and ground.

14. A device according to claim 5, characterized in that a varistor (18, 26) is also disposed between each discharger and ground.

15. A device according to claim 2, characterized in that the filtering cell (14) also comprises a means (14B) for switching the cut-off frequency of the low-pass filter (14A) in series therewith.

16. A device according to claim 3, characterized in that the filtering cell (14) also comprises a means (14B) for switching the cut-off frequency of the low-pass filter (14A) in series therewith.

17. A device according to claim 4, characterized in that the filtering cell (14) also comprises a means (14B) for switching the cut-off frequency of the low-pass filter (14A) in series therewith.

18. A device according to claim 5, characterized in that the filtering cell (14) also comprises a means (14B) for switching the cut-off frequency of the low-pass filter (14A) in series therewith.

19. A device according to claim 6, characterized in that the filtering cell (14) also comprises a means (14B) for switching the cut-off frequency of the low-pass filter (14A) in series therewith.

20. A device according to claim 2, characterized in that the first clipper, the assembly formed by the filter of the main clipping cell and the second clipper, and the filtering cell are each contained in a radioelectrically insulated enclosure.

21. A device according to claim 3, characterized in that the first clipper, the assembly formed by the filter of the main clipping cell and the second clipper, and the filtering cell are each contained in a radioelectrically insulated enclosure.

22. A device according to claim 4, characterized in that the first clipper, the assembly formed by the filter of the main clipping cell and the second clipper, and the filtering cell are each contained in a radioelectrically insulated enclosure.

* * * * *